Figure 1:
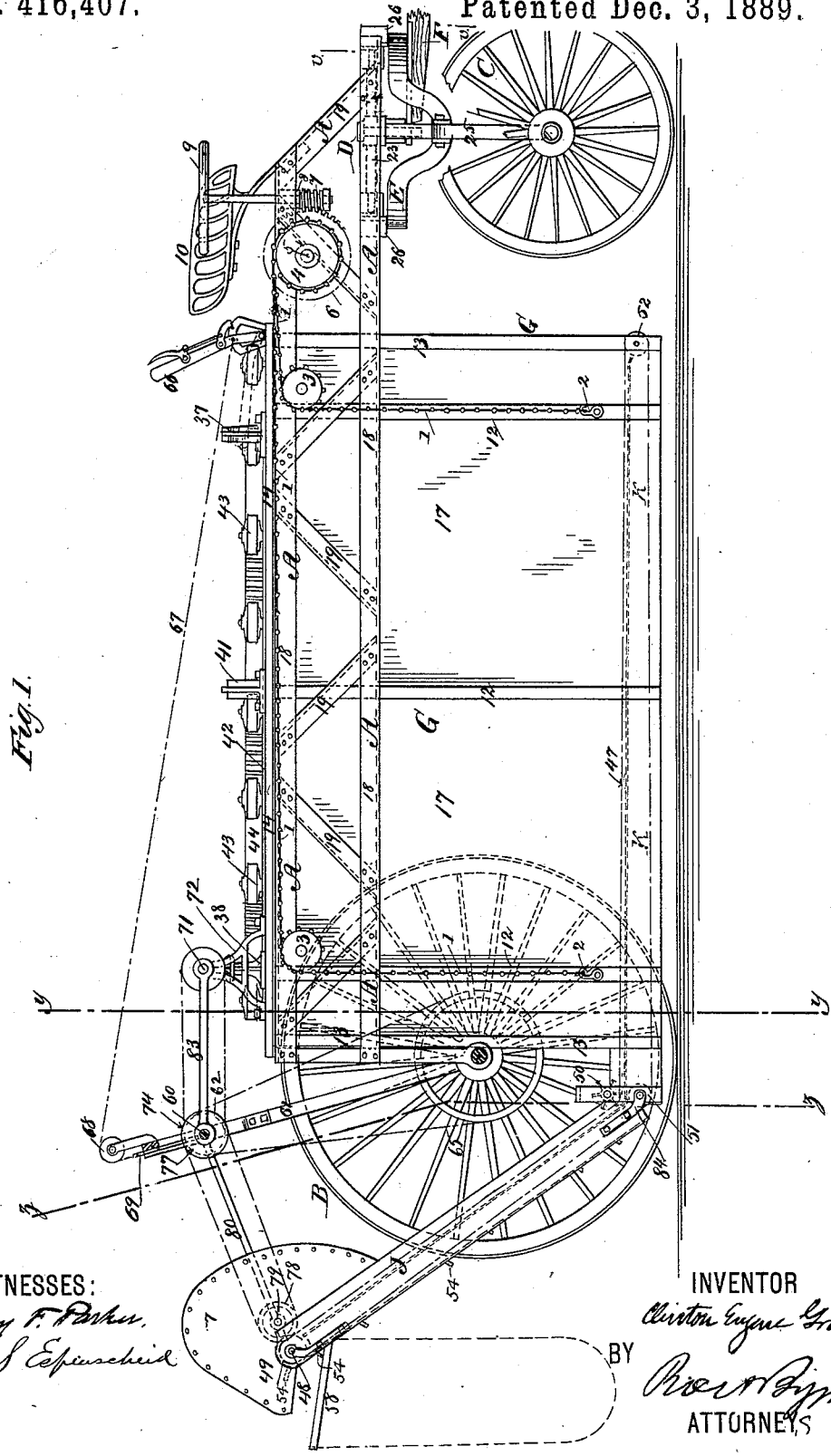

(No Model.)  4 Sheets—Sheet 1.

C. E. GRAVES.
COTTON HARVESTER.

No. 416,407. Patented Dec. 3, 1889.

WITNESSES:

INVENTOR
Clinton Eugene Graves
BY
ATTORNEYS (No Model.) 4 Sheets—Sheet 2.

C. E. GRAVES.
COTTON HARVESTER.

No. 416,407. Patented Dec. 3, 1889.

WITNESSES:
Henry F. Parker
George S. Espenscheid

INVENTOR
Clinton Eugene Graves
BY
ATTORNEYS (No Model.)  
4 Sheets—Sheet 3.

C. E. GRAVES.
COTTON HARVESTER.

No. 416,407. Patented Dec. 3, 1889.

Fig. 3.

WITNESSES:  
Henry F. Parker  
George S. Espenscheid

INVENTOR  
Christon Evans Graves  
BY  
ATTORNEYS (No Model.) 4 Sheets—Sheet 4.
C. E. GRAVES.
COTTON HARVESTER.
No. 416,407. Patented Dec. 3, 1889.
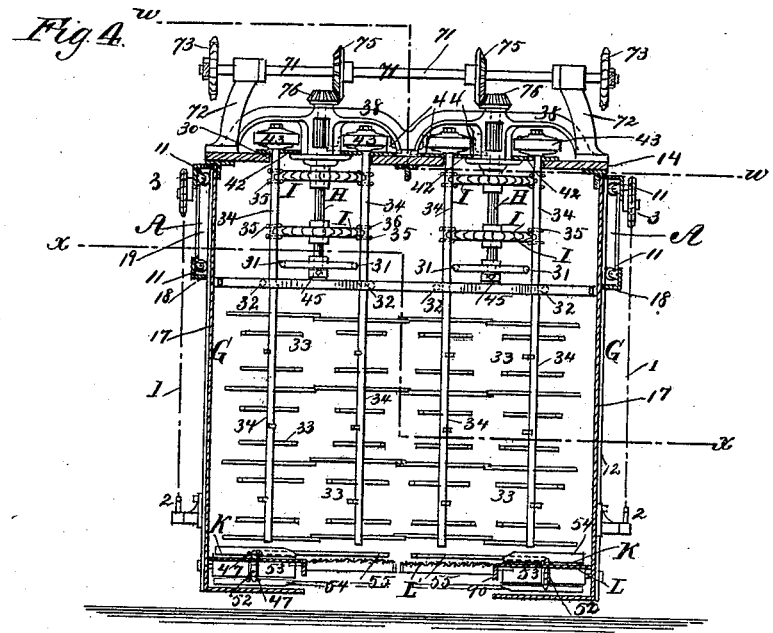
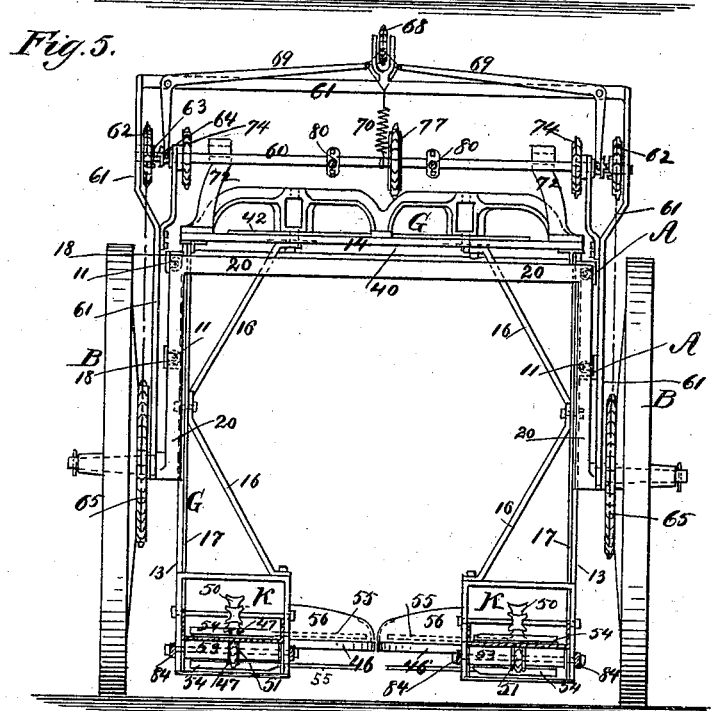
WITNESSES:
INVENTOR
BY
ATTORNEYS
N. PETERS, Photo-Lithographer, Washington, D. C.

UNITED STATES PATENT OFFICE.

CLINTON EUGENE GRAVES, OF KANSAS CITY, MISSOURI, ASSIGNOR, BY DIRECT AND MESNE ASSIGNMENTS, TO THE GRAVES COTTON HARVESTER COMPANY, OF NEW YORK.

COTTON-HARVESTER.

SPECIFICATION forming part of Letters Patent No. 416,407, dated December 3, 1889.

Application filed November 3, 1888. Serial No. 289,904. (No model.)

*To all whom it may concern:*

Be it known that I, CLINTON EUGENE GRAVES, a citizen of the United States, residing at Kansas City, in the county of Jackson, in the State of Missouri, have invented certain new and useful Improvements in Cotton-Harvesters, of which the following is a specification.

My invention relates to cotton-picking machines in which steel brushes are employed to knock and shake out the ripe portions of cotton from the burrs by coming into general contact with the plants. In machines heretofore the brushes have been so arranged and operated as to prove incapable of insuring access to every part of the plant, thereby leaving a considerable percentage of the cotton undisturbed in the burrs.

To insure the access of the picker-brushes to every portion of the cotton-plant is the object of my invention; and the same consists of certain novel mechanism whereby I give a combined longitudinal and rotary movement to the brushes that are projected from vertical spindles at each side of the row of plants, and whereby a succession of brushes rotatively operated, afford ample opportunity for every part of the plant to be reached during the passage of the machine, and I also impart a reversal at intervals as to the direction in which the brushes are rotated, so that the brushes are applied with equal efficiency to both sides of the stems between which they enter; and my said invention also consists of an improved conveyer and elevator, whereby all of the accumulated cotton which gravitates into the conveyer is delivered to a given receiving-point of the machine.

My invention further comprises certain other novel features of mechanism, hereinafter specified, adapted to carry out the practical requirements of a harvester of the present class; and in order to enable others skilled in the art to which my invention appertains to understand and use the said invention I will proceed to describe its construction in detail, explain its operation, and subsequently point out in the appended claims its novel characteristics.

Figure 2:
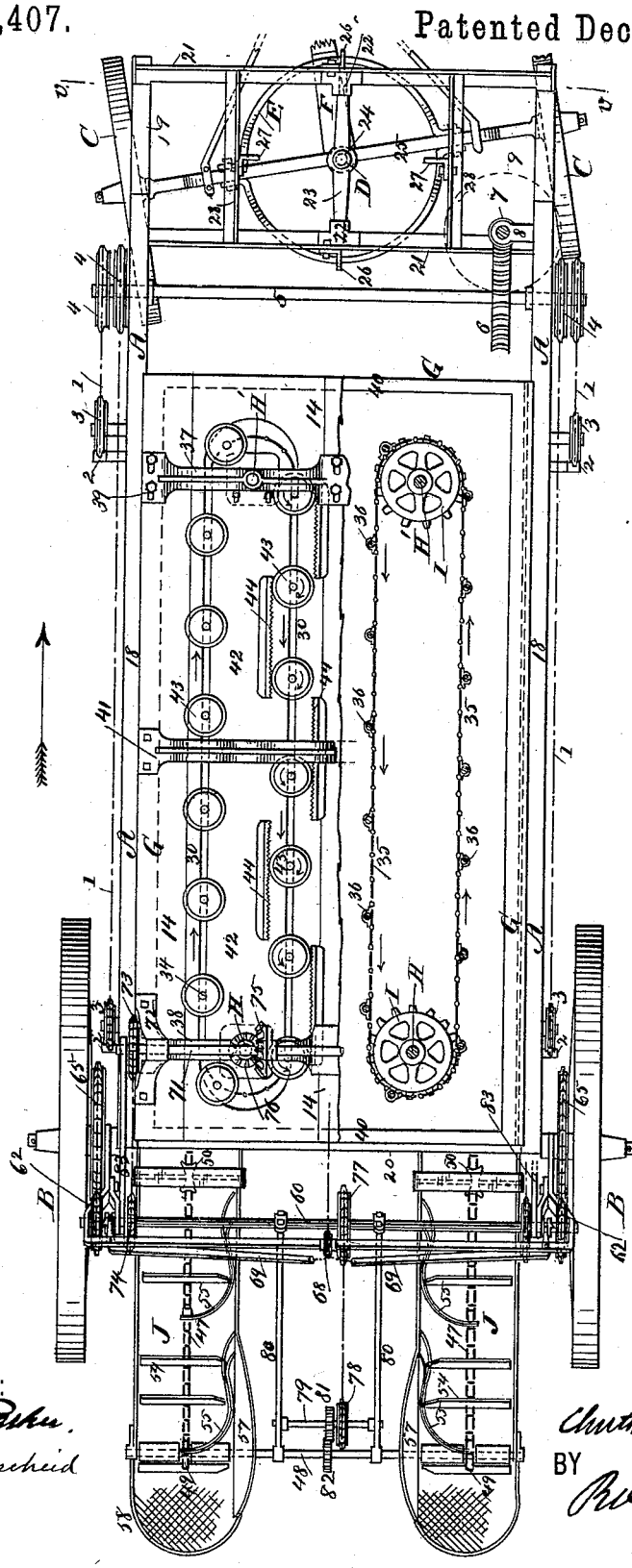

Referring to the accompanying drawings, forming a part of this application, and in which similar characters of reference indicate corresponding parts throughout, Figure 1 is a side elevation of the machine, partly in section; Fig. 2, a plan view, partly in horizontal section, on the line $w$ $w$, Fig 4; Fig. 3, a horizontal section corresponding with the line $x$ $x$, Fig. 4; Fig. 4, a transverse section on the line $y$ $y$, Fig. 1; Fig. 5, an end view of the machine with the elevators and other parts removed, being taken at the line $z$ $z$, Fig 1; and Fig. 6 is a detail view, in elevation, of a portion of the front axle and the fifth-wheel, other connecting parts being in section on the line $v$, Fig. 2.

A A is a truss-frame borne upon the rear truck-wheels B and the forward truck-wheels C, and the latter are swiveled upon a king-bolt D and fifth-wheel E, to which fifth-wheel is fixed a tongue F, by which the vehicle may be drawn and guided at will by means of horses or other draft-power.

The motive power for actuating the various parts of the machine is derived from the draft-power, being imparted to the mechanism by the traction of the truck-wheels B and transmitted through various chain belts and sprocket-wheels connected therewith, as hereinafter specified.

The machine is adapted to act upon both sides of the row of cotton-plants simultaneously, and to this purpose the axles of the traction-wheels and the steering-wheels are arched, as shown in Figs. 5 and 6, to straddle the row of plants.

The frame G, which carries the entire picking, conveying, and elevator mechanism, is separate from the frame A, and is vertically movable therein for the adjustment at variable distances from the ground, according to the height of the row of plants. The frame G is suspended in the frame A by means of the elevating-chains 1, connected to hooks 2 on the lower parts of the frame G, said chains 1 passing over idle sprocket-pulleys 3 to the winding sprocket-wheels 4, to which the ends of each chain are connected. The winding-wheels 4 are fixed to the transverse shaft 5, having bearings in the frame A, and upon which shaft is also fixed a worm-gear 6, with which a worm 7, rotative in the bearing-bracket 8, engages. By means of the hand-wheel 9 the worm 7 is revolved and the necessary leverage obtained to hoist or lower the frame G at the pleasure of the operator, for whose convenience a seat 10 is provided attached to the frame A. The frame G is sustained against horizontal displacement by the anti-friction rollers 11 upon the frame A, which bear upon the vertical bars 12, composing a part of the frame G, and permit the lattter to be moved vertically.

The frame G is composed of vertical bars 12 and 13, a table 14, the horizontal framing of the conveyers K, and suitable diagonal braces, as 16, which may be employed, if desired, at each end of the machine, which act to stiffen the parts of the frame G with relation to each other. The diagonal braces 16, however, are omitted in Figs. 1 and 3, not being essential to the construction of the machine. The sides of the frame G are sheathed with walls 17, of sheet metal or other suitable material, that confine the pickers to prevent the cotton being thrown out.

The frame A is composed of longitudinal angle-iron bars 18, having diagonal stiffening-braces 19, and to the rear ends of the bars 18 the arched axle-beam 20 of the rear truck is firmly fastened, the hubs of the driving-wheels B being independently rotative thereon. At the forward ends of the lower bars 18 transverse bars 21 unite the frame A and have swivel-bearings 22, in which a longitudinal swivel-bar 23 is operative. The king-bolt D of the fifth-wheel E passes through the eye 24 of the swivel-bar, and also through the eye at the center of the arched axle-bar 25 of the forward truck.

The fifth-wheel E, bearing on the fore and aft bearing-blades 26, fixed to the frame A, steadies the truck against forward and back movements, while the position of said bearing-blades permits a freedom of side or rocking movement of the axle 25 should the wheels pass over rough or irregular ground, the axis of oscillation being at the trunnions of the swivel-bar. This feature is of importance to prevent the twisting of the frames and the racking of the machinery when the vehicle is in motion. When the wheels C are brought about at or approaching a right angle to their normal position, the elevated bearing-edges of the fifth-wheel E are received by the additional bearing-blades 27, fixed to the bars 28 of the frame A, so that the rocking motion is checked, as otherwise it would be objectionable in allowing the arched axle 25 to drag.

H H' are the shafts, which by a continuous rotation drive the pickers in an orbit corresponding with the slot 30, Fig. 2, and corresponding with the way formed by the steadying-rods 31 32, Fig. 3. The shafts H H' are journaled in brackets 38 and 37, fastened to the table 14 of the frame G. The pickers consist of brushes 33, made of flexible material, preferably of flat steel wire, that are inserted in the spindles 34 in pairs, intersecting them at suitable intervals and at various radiating angles, as indicated. The mechanism for driving the spindles 34 is adapted to effect successive periods of reverse rotation of the said spindles as the same pass along the active side of their orbit—that is to say, the period of said orbit during which the spindles engage with the row of plants. The tips or free ends of the brushes have curvatures that are oppositely disposed, as appears in the plan view, Fig. 3, so as to secure the full elastic force of the wire as they come in contact with the tufts of cotton and strike and shake them from the burrs irrespective of the direction of rotation. These combined motions of the spindle are derived in the manner forthwith explained. Each shaft H H' is provided with an upper and a lower sprocket-wheel I I, having teeth which vertically correspond. The endless sprocket-chains 35 are driven in the direction of the arrows, Figs. 3 and 2, upon the wheels I, the power being applied to the shafts H. The lineal speed at which the endless chains or belts 35 are driven should correspond substantially to that at which the vehicle is propelled over the ground, whereby a retrograde movement is obtained and each spindle remains at the same point relative to the row of plants while being rotated to and fro upon its own axis in the plant. The spindles have bearings in the chain belts, and for this purpose there are links 36, having journals located at corresponding points in the upper and lower belts at regular distances apart. The vertical positions of the spindles are maintained by the chains themselves, which are drawn taut by the adjustment of the bracket 37, having slotted bolt-holes 39 for the purpose.

The table 14 is constructed preferably of wood, supported on the end cross-bars 40 of the frame G, and the central cross-bar 41, which latter has a series of arches to clear the tops of the spindles. Upon the table 14 are metal plates 42, which are fastened to portions of the brackets 37 38 and the cross-bar 41. In these plates 42 and over an aperture in the table is formed an endless slot or groove 30, which acts as a guide for the spindles. The tops of the spindles are provided with rollers 43, that are faced with india-rubber or other compressible material, and there are engaging surfaces or racks 44, fixed to the table 14 or to the plates thereon, each of which racks has a milled surface adapted to engage upon the periphery of the said rollers as the latter are passed opposite them. The racks 44 are of such length as to give a single rotation to the spindles and are placed alternately on opposite sides of that part of the groove 30 nearest the plants. Successive complete rotations of the brushes are thereby effected in opposite directions during passage upon the active side of the orbit, and upon passing around the shaft H the brushes are permitted to remain inactive until again brought forward and returned to the plants. The spindles are guided by both the slot 30 and also the ways formed by the rods 31 32 beneath. The latter are placed sufficiently apart, however, to permit a certain amount of side play of the inner spindles should an unusual resistance of the plant require it. The rods 32 are fastened to frame G, and the rods 31 supported by collars 45, held on the lower ends of the shafts H H', so that the necessary endless groove is formed.

K K are the conveyers, and J J the elevators, which collect and deliver the cotton from the space beneath the pickers. As the cotton gravitates it is received upon the conveyer-plates L and the aprons L', upon the surfaces of which the conveyers sweep the entire breadth. The outer portions or conveyer-plates L of the receiving-surfaces are constructed of sheet metal or other stiff material, as also are the troughs of the elevators J. The inner margins of the plates L are stiffened by flanges or ribs 90, projecting downward and extending the entire length thereof. The inner portions or aprons L' are composed of flexible material—such as canvas—and such flexible material is supported and distended by means of spring-ribs 46, that are adapted to yield when the stalks of the cotton-plants pass between them, but tend to close in as far as possible toward one another and form a complete repository.

The conveyers and elevators J are provided with endless chain belts 47, running the entire length of the machine, and they are driven by the shaft 48, bearing sprocket-wheels 49, that engage with the said belts. The belts are carried over the idle sprocket-wheels 50, 51, and 52, and there are rollers 53, placed each side of the sprocket-wheels 49, 51, 52, on their shafts, which serve to steady the conveying-blades as the latter pass over the sprocket-wheels. The sprocket-wheels 50 are constructed to allow the blades 54 to pass under them, and to this purpose have their prongs or teeth made deep and of a Y shape, as seen in Fig. 5, to insure the retention of the chain 47 upon them in its proper course, such prongs or teeth straddling the blades 54 as they arrive and pass under the said sprocket-wheels 50. To the chain belts 47 are attached at suitable intervals the blades 54, having a breadth corresponding to that of the elevator-troughs. There are also elongated sweepers 55, connected at suitable intervals to the chain belts 47, being projected therefrom sufficiently to cover or nearly cover the flexible aprons.

In order that the sweepers 55 may readily pass through the elevators, (which must be located apart to permit the passage of the plants,) the said sweepers are made flexible, preferably of flat steel wire or strips of thin metal united at the point of attachment to the chain, but having their free ends separated to form brushes. There are converging shields 56 at the point of entrance to the elevators, upon the inner surfaces of which the brushes or sweepers 55 are carried in, as indicated, passing within the elevator-trough, lying flat upon the same until the turning-point at 49 is reached, at which time the sweepers are necessarily thrown out, and there are shields 57 at the summit of the elevators, which confine the sweepers when so thrown out until their return passage beneath the elevator-troughs. The sweepers 55 have hooked or curved ends, whereby the cotton is grasped by such ends as they are contracted under the converging surfaces of the shields 56 and brought into the elevators. The scrapers or blades 54 and the sweepers 55 return to the forward end of the machine through the spaces provided therefor beneath the elevator-troughs and beneath the receiving-plates.

From a hoop 58 at the top of the elevators the bags are depended which receive the cotton, and are detachable and may be replaced from time to time.

The driving mechanism is organized in a manner that will permit its connection to the pickers and to the elevators irrespective of the height at which the frame G is adjusted. For such purpose I employ an intermediate or counter shaft 60, journaled in a swivel-frame 61, fulcrumed upon the gudgeons axial to the traction-wheels B. There are sprocket-wheels 62, loose upon the shaft 60, but which have clutch-faces 63, toward or from which clutch-collars 64, feathered to the shaft and rotative with it, may be shifted at will. Motion is constantly imparted to the loose sprocket-wheels 62 from the sprocket-wheels 65, fixed to the traction-wheels and connected by the chain belt indicated. By the engagement or disengagement of the clutch-collars 64 the shaft 60, with its connected mechanism, is thrown into or out of gear, and this is accomplished at will by means of the hand-lever 66 and chain 67, passing over the pulley 68, and thence to the levers 69, that connect with the clutch-collars in a manner that is usual in such devices. The spring 70 tends to engage the clutches when the hand-lever is released, the latter having a suitable grip-pawl to secure it. The clutches, having beveled teeth, as seen, permit the independent turning of the driving-wheels without injury to the parts or the backing of the vehicle without operating the machine.

71 is a transverse driving-shaft of the pickers, and has its bearings in the brackets 72. The shaft 71 bears sprocket-wheel 73, receiving their motion by chain belts from the wheels 74, fixed to the shaft 60. The shaft 71 also has beveled gears 75, which mesh into the beveled gears 76 of the picker-shafts H H. The elevator-shaft 48 is driven from the sprocket-wheel 77 of the shaft 60, the chain belt thereof connecting to a sprocket-wheel 78 on the small counter-shaft 79, journaled between the rods 80. Gears 81 82 are employed between the counter-shaft 79 and the shaft 48, to give the proper direction of rotation. The distance between the counter-shaft 60 and the shaft 71 and also the shaft 48 is maintained irrespective of the height of the frame G by means of the connecting-rods 83 and the connecting-rods 80, which support the driving-chains taut at all positions, and, moreover, the elevators J are hinged at 51 by the lugs 84 to permit the various adjustments.

It is to be understood that I may employ other belts than sprocket-chain belts at any or all parts of the machine; but I prefer to employ the same for the convenience of construction. It is to be further observed that drums may be employed in lieu of the double sets of sprocket-wheels I, and that a single flat belt of sufficient width to carry the spindles may be used as an alternative for the double sprocket-chains 35 illustrated.

I do not confine myself to the details of construction nor the proportion of parts herein illustrated as embodying my invention, as the said parts may be variously modified within the scope of said invention; but

What I claim, and desire to secure by Letters Patent, is—

1. In a cotton-harvester, the combination, with a vehicle, of the endless carrying belt or belts, the picker-brushes, and vertical brush-bearing spindles located at successive intervals upon such endless carrying belt or belts, said spindles having a rotatory motion upon their several axes and a progressive motion upon said belt or belts opposite the direction of motion of the vehicle and parallel with the row of plants when in contact with the latter.

2. In a cotton-harvester, the combination, with a vehicle, of the endless carrying belt or belts, the picker-brushes, and vertical brush-bearing spindles located at successive intervals and having a progressive motion upon such endless carrying belt or belts, and having a rotatory motion upon their several axes reversible at successive periods of said progressive motion during which the brushes are in contact with the plants, for the purposes specified.

3. The combination, in a cotton-harvester, of the endless carrying belt or belts, the picker-brushes, and vertical brush-bearing spindles located at successive intervals upon such endless belt or belts, pulleys upon said spindles, and stationary racks adapted to engage with said pulleys during the progressive motion of the spindles upon said belt or belts, for the purposes specified.

4. The combination, with the vehicle of a cotton-harvester, of the endless carrying belt or belts, the picker-brushes, and vertical brush-bearing spindles located at successive intervals upon such endless belt or belts, said belt or belts being parallel with the row of plants, and pulleys upon said spindles, and racks fixed to said vehicle, located in alternating positions upon opposite sides of the part of the orbit of said belt or belts that is adjacent to the row of plants, the lineal speed of retrogression of the said belts with their spindles substantially equaling the speed of the vehicle, in the manner and for the purposes set forth.

5. The herein-described cotton-picker, consisting of a spindle transversely intersected by flexible wires arranged in pairs, having curvatures at their free ends disposed in opposite directions with reference to rotation, adapted to act alike with each direction of rotation of said spindles, when applied in the manner set forth.

6. In a cotton-harvester, the combination of the endless picker-belts, driving-shafts for the same actuated from the traction-wheels of the vehicle, series of vertical brush-bearing spindles journaled in said belts, a table above said belts, having a slot coincident with the orbit of the belts and through which the spindles project, friction-pulleys upon said spindles, and a series of alternating friction-racks at the opposite sides of the said slot at that portion thereof corresponding with the orbit of the belts adjacent to the plants.

7. The combination, in a cotton-harvester, of the endless belt or belts, rotatory pickers thereon progressive therewith at each side of the row of plants, receiving-plates beneath the pickers on the outer portion of the belt or belts, flexible aprons beneath the remainder of the pickers projected on a level with said receiving-plates toward the stalk of the plants, and conveyers propelled longitudinally upon the receiving-plates and adapted to deliver the cotton that gravitates upon the plates to the ends thereof.

8. The combination, in a cotton-harvester, of the endless belt or belts, rotatory pickers thereon progressive therewith at each side of the row of plants, receiving-plates beneath the pickers on the outer portion of the belt or belts, flexible aprons beneath the remainder of the pickers projected on a level with said receiving-plates toward the stalk of the plants, ascending elevator-troughs at the ends thereof, conveying chains or belts propelled longitudinally upon the receiving-plates and upon said ascending troughs, said belts having suitable driving and guiding sprocket wheels or pulleys, as specified, and having transverse conveying-blades and transverse sweepers projected horizontally upon said aprons, and the converging shields 56 at the base of the elevators adapted to contract the said sweepers into the elevator-troughs, in the manner and for the purposes set forth.

9. In a cotton-harvester, the combination of a truss-frame supported upon the traction-wheels and steering-wheels of the vehicle, a separate machine-carrying frame vertically movable in said truss-frame, a transverse picker driving-shaft 71 upon said machine-carrying frame, elevator-troughs pivoted to the machine-carrying frame, a transverse elevator driving-shaft 48 on the trough, a swivel frame fulcrumed to the traction-wheel axle, and a transverse counter driving-shaft 60, the latter having bearings in said swivel-frame at a fixed distance from the traction-wheel axles connected by rods at fixed distances relative to said shafts 71 and 48, and having the described pulley and belt connections with the traction-wheels and said shafts, the whole adapted to operate irrespective of the adjustment of said machine-carrying frame, as set forth.

In testimony whereof I have hereunto set my hand, this 30th day of October, 1888, in the presence of two subscribing witnesses.

CLINTON EUGENE GRAVES.

Witnesses:
GEORGE S. ESPENSCHEID,
ADOLPH POOCHREIM.